Patented Jan. 1, 1952

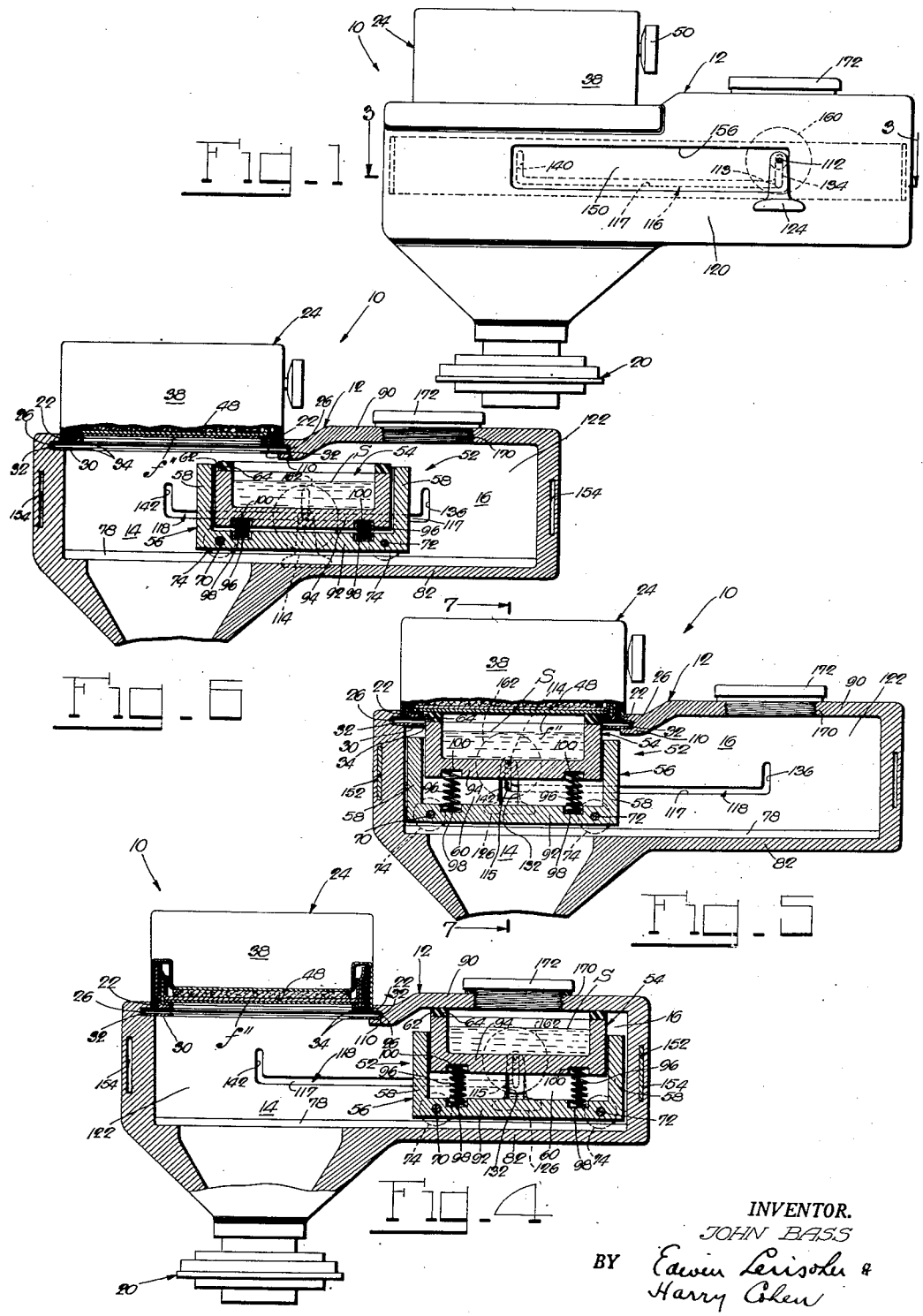

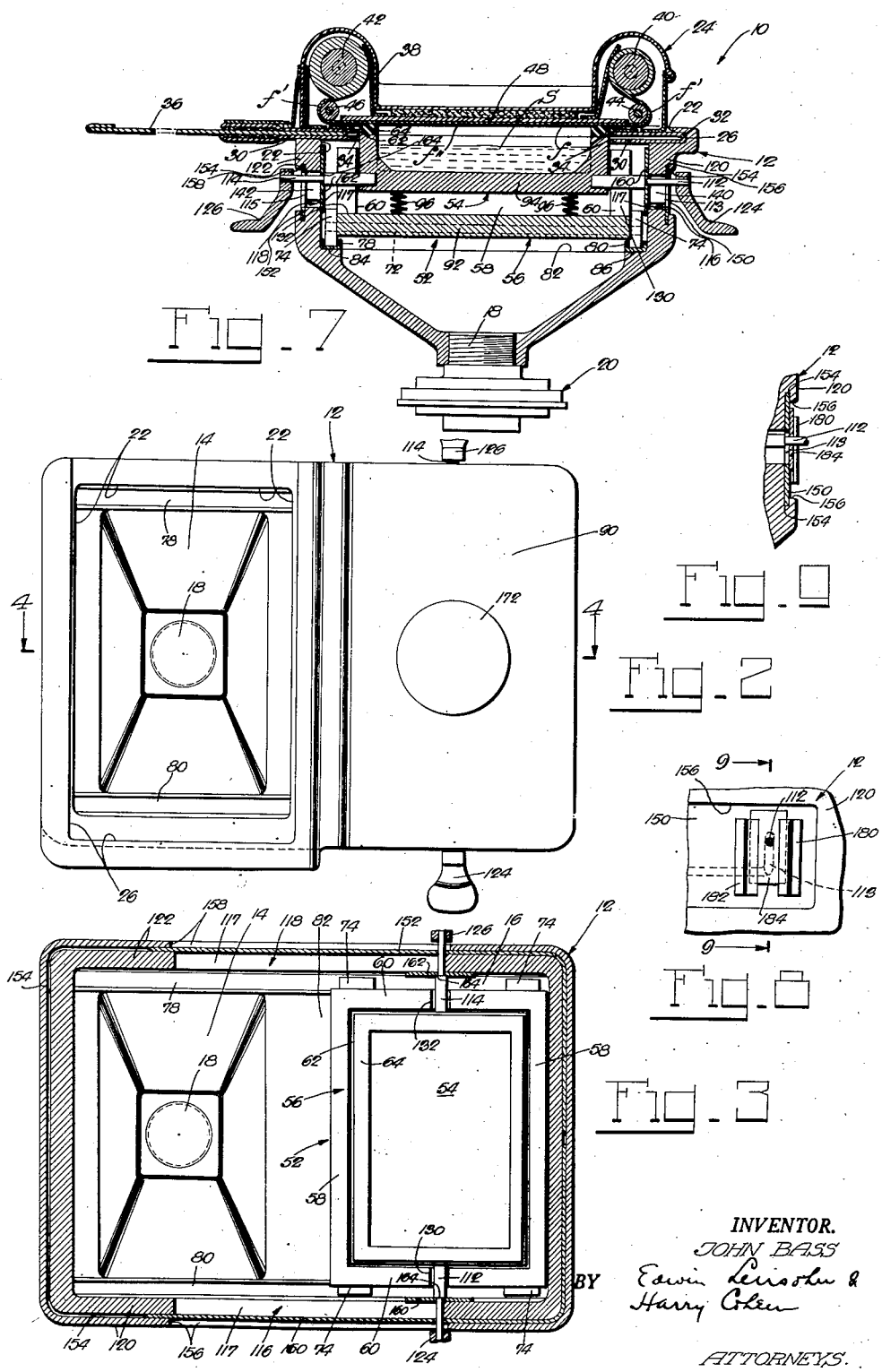

2,580,720

UNITED STATES PATENT OFFICE 2,580,720

COMBINATION CAMERA AND DEVELOPER

John Bass, New York, N. Y.

Application October 26, 1949, Serial No. 123,698

16 Claims. (Cl. 95—13)

This invention relates to photography in general, and to a combination camera and developer in particular.

It is the primary aim and object of the present invention to provide photographic apparatus which comprises as a unitary part thereof a camera and, as a further unitary part thereof, also developing equipment, including the requisite chemical solution or solutions, by means of which the user of the apparatus may develop a film immediately after its exposure and before its removal from the camera.

It is another object of the present invention to provide in the dark chamber of the camera apparatus of this type development equipment which may be manipulated from the outside of the apparatus for the performance of its designated function of developing a film while the latter is still in the same position in the camera in which it was exposed.

It is another object of the present invention to make provisions in apparatus of this type for securely sealing the chemical solution or solutions therein against leakage from the developing equipment thereof when the latter is not used or when it is in use, thereby to permit ordinary handling or carrying of the apparatus without any regard to the presence of the chemical solution or solutions therein, except during brief manipulation of the developing equipment preparatory to each performance thereof.

It is another object of the present invention to make provisions in apparatus of this type for readily replacing therein solution or solutions contaminated through long or frequent use with fresh solution or solutions.

The above and other objects, features and advantages of the present invention will be more fully understood from the following description considered in connection with the accompanying illustrative drawings.

In the drawings:

Fig. 1 is a side elevation of photographic apparatus embodying the present invention;

Fig. 2 is an end view of the apparatus;

Fig. 3 is a section taken substantially on the line 3—3 of Fig. 1;

Fig. 4 is a section taken substantially on the line 4—4 of Fig. 2;

Figs. 5 and 6 are fragmentary sections similar to Fig. 4, showing certain equipment of the apparatus in different positions;

Fig. 7 is a section taken on the line 7—7 of Fig. 5;

Fig. 8 is a fragmentary view of a modified part of the apparatus; and

Fig. 9 is a fragmentary section taken on the line 9—9 of Fig. 8.

Referring to the drawings, the reference numeral 10 designates photographic apparatus which comprises a housing 12 providing a conventional dark chamber 14 of a camera and a communicating ante-chamber 16. The housing 12 has suitably mounted at 18 on one end of the dark chamber 14 a conventional lens and shutter mechanism 20, while the opposite end of the dark chamber 14 is apertured at 22 for the exposure to the mechanism 20 of a film $f$ in a roll film holder 24, for instance, which may removably be mounted in a guideway 26 in the apertured end 22 of the dark chamber 14.

The roll film holder 24 may be of conventional type, having the usual face frame 30 which is provided on three sides thereof with marginal ribs 32 (Figs. 4 and 7) for its sliding support in the guideway 26. The frame 30 of the roll film holder 24 is further provided with an exposure opening 34, as well as with a slide 36. Removably carried in any suitable manner by the frame 30 of the roll film holder 24 is a casing 38 in which film-supply and film wind-up spools 40 and 42, respectively, are suitably removably mounted for rotation about their respective axes. The unwound film $f'$ between the spools 40 and 42 is passed over guide rolls 44 and 46 which hold an exposure length or section $f''$ of the film in close proximity to the adjacent exposure opening 34 in the frame 30. The unwound film $f'$ between the guide rolls 44 and 46 is furthermore resting against a conventional backing plate 48 which is rigidly mounted in the casing 38. The film wind-up spool 42 is in a conventional manner (not shown) releasably connectible with the customary knob 50 on the outside of the film holder 24 (Fig. 1) with which to rotate the wind-up spool for the purpose of bringing consecutive exposure lengths or sections $f''$ of the film within the confines of the exposure opening 34 in the frame 30.

The instant apparatus also provides as a unitary part thereof a film-developing device or equipment 52 which comprises, in the present instance, a tray 54 and a carriage 56 therefor. The carriage 56, which in the present instance resembles a container, is provided with side walls 58 and end walls 60 (Figs. 3 and 5) between which the tray 54 is guided for movement into and from the carriage 56 (Figs. 5 and 6). The tray 54 is in its preferably rabbeted top rim 62 provided with a continuous sealing member 64 which may be of rubber or any other suitable liquid-sealing material. The carriage 56 is provided on its opposite sides with shafts 70 and 72, respectively, each of which carries wheels 74 on its opposite ends for moving the carriage 56 and the tray 54 therein on tracks 78 and 80 from the idle position shown in Fig. 4 into the "developing" position shown in Fig. 5, and vice versa. The tracks 78 and 80 may be in the form of channels extending on the bottom wall 82 of the ante-chamber 16 and over opposite shoulders 84 and 86, respectively, in the dark chamber 14 (Fig. 7).

The tray 54 holds a supply of developer solution S with which to treat an exposed film section f'' in the exposure opening 34 of the mounted film holder 24. To prevent leakage of the developer solution S from the tray 54 when the device 52 is either in its idle position or in its developing position, the tray 54 is with its sealing member 64 forced against the top wall 90 of the ante-chamber 16 and against the film section f'' in the film holder 24, respectively (Figs. 4 and 5). To this end there are interposed between the bottoms 92 and 94 of the carriage 56 and tray 54, respectively, a plurality of compression springs 96. The springs 96 are conveniently located with their opposite ends in aligned recesses 98 and 100 in the carriage 56 and tray 54, respectively. In the present instance, there are provided four springs 96 which are arranged near the corners of the tray 54 so that they will have a tendency to prevent tilting of the tray in the carriage 56 when the former is being depressed in the latter from the position shown in Fig. 5 into the position shown in Fig. 6. The springs 96 have sufficient compressing force to effect reliable sealing engagement of the member 64 on the tray 54 with the top wall 90 of the ante-chamber 16 or with an exposed film section f'' in the mounted film holder 24 (Figs. 4 and 5).

For the development of an exposed film section f'' in the mounted holder 24, the device 52 is shifted from the idle position shown in Fig. 4 into the developing position shown in Fig. 5. In order that the tray 54 may, during such shift of the device 52, clear the inward formation 110 on the housing 12 and also the frame 30 of the mounted holder 24 (Fig. 6), the tray 54 will have to be depressed until it is in alignment with, and may enter, the exposure opening 34 in the holder 24 (Fig. 5). After the tray has been brought into sealing relation with the exposed film section f'' in the holder 24, the apparatus is inverted from the position shown in Fig. 5 in order to expose said film section f'' to the action of the solution S in the tray 54. After completed development of the film section f'', the apparatus is reinverted to its original position (Fig. 5) to permit the succeeding shift of the device 52 into idle position without spilling solution S from the tray 54.

Inasmuch as the development of an exposed film section f'' takes place after its exposure and in the mounted holder 24, and a new film section f'' to be exposed may subsequently be advanced into the exposure opening 34 without closing the slide 36 at any time, provisions are made for shifting the developing device 52 from idle into developing position, and vice versa, and for depressing the tray 54, from the outside of the housing 12 without, however, admitting light into either of the chambers 14 or 16. To this end, the tray 54 carries on its opposite ends projecting studs 112 and 114, respectively, which extend through slots 116 and 118 in the adjacent side walls 120 and 122, respectively, of the housing 12 (Figs. 1, 3, 4 and 7). The studs 112 and 114 carry on the outside of the housing 12 handles 124 and 126, respectively, by means of which to depress the tray 54 into the carriage 56 (Fig. 6). The opposite end walls 60 of the carriage 56 are slotted at 130 and 132, respectively, to provide clearance for the studs 112 and 114, respectively, when the tray 54 is depressed. The slots 116 and 118 are at one end thereof laterally offset as at 134 and 136, respectively (Figs. 1 and 5), wherein the respective studs 112 and 114 are received (Figs. 1 and 4) when the tray 54 is, in the idle position of the developing device 52, in sealing engagement with the top wall 90 of the ante-chamber 16. The slots 116 and 118 are at their other ends laterally offset as at 140 and 142, respectively, wherein the respective studs 112 and 114 are received when the tray 54 is, in the developing position of the device 52, in sealing engagement with an exposed film section f'' in the mounted holder 24 (Figs. 5 and 7). The slots 116 and 118 are further arranged so that the tray 54 must be depressed (Fig. 6) in order that the studs 112 and 114 may travel in the linear or main portions 117 of the slots 116 and 118, respectively. Thus, regardless of whether the developing device 52 is shifted from its idle position or from its developing position, the tray 54 must in each instance be first depressed on the handles 124 and 126 before the device 52 may be shifted, as will be readily understood. Of course, reasonable care must be exercised by the user of the apparatus to hold the same during a shift of the developing device 52 so that no developer solution S will splash or flow from the tray 54 while the latter is not in sealing engagement either with the top wall 90 of the ante-chamber 16 or with a film section f'' in the mounted holder 24.

To prevent extraneous light from entering the chambers 14 and 16 in the housing 12 through the slots 116 and 118 in any position of the developing device 52, there are provided over the slots 116 and 118 light shields 150 and 152, respectively, which are in the form of flexible bands, preferably of the steel-tape type. The light shields 150 and 152 are slidable in a continuous guideway 154 which may conveniently be provided internally of the housing 12 (Figs. 3 and 4). The side walls 120 and 122 of the housing 12 are throughout the extent of the slots 116 and 118 therein recessed at 156 and 158, respectively, to admit to the outside of the housing 12 the studs 112 and 114, respectively, in any position of the developing device 52. The studs 112 and 114 in the tray 54 project through transverse slots 113 and 115 in the light shields 150 and 152, respectively (Figs. 1, 4 and 7), whereby these studs are connected with said light shields for unitary movement with the latter in the direction of the main portions 117 of the slots 116 and 118, but are free to move in the laterally offset ends 134, 136 and 140, 142 of these slots relative to the light shields 150 and 152, as will be readily understood. The recesses 156 and 158 in the side walls 120 and 122, respectively, of the housing 12 are of lesser width than the light shields 150 and 152 (Fig. 7) so as to prevent extraneous light from entering the interior of the housing 12 through these recesses. The shields 150 and 152 are of such lengths on opposite sides of the respective studs 112 and 114 that they will effectively seal the respective slots 116 and 118 from extraneous light in any position of the developing device 52.

To prevent extraneous light from entering the housing 12 through the transverse slots 113 and 115 in the shields 150 and 152, respectively, further light shields are provided in the form of disks 160 and 162, for instance, which are carried by the studs 112 and 114, respectively, and preferably forced by shoulders 164 on the latter into light-sealing engagement with the adjacent side walls 120 and 122, respectively, of the housing 12 (Figs. 3 and 7). The shields 160 and 162 are sufficiently large in diameter to cover the adjacent slots 113 and 115 in the shields 150 and 152, respectively (Figs. 4, 5 and 6). Thus, the shields 150 and 152 prevent extraneous light from entering the apparatus through the slots 116 and 118 in the side walls 120 and 122, respectively, of the housing 12, while the shields 160 and 162 prevent extraneous light from entering the apparatus through the transverse slots 113 and 115 in the shields 150 and 152, respectively.

For conveniently draining from the tray 54 developer solution which through long or frequent use has become contaminated, and also for charging the tray 54 with fresh solution, there is provided in the top wall 90 of the ante-chamber 16 an opening 170 which is normally closed by a sealing plug 172.

Figs. 8 and 9 show a modified arrangement of the shields which are to seal the transverse slots 113 and 115 in the shields 150 and 152, respectively, from extraneous light. Thus, the shield 150, for example, is shown as having spot-welded or otherwise secured thereto spaced gibs 180 and 182 in which is slidable a shield 184 of sufficient length to cover the transverse slot 113 in the shield 150 regardless of the position therein of the stud 112. To accommodate the shield 184 on the outside of the shield 150, it is, of course, necessary to make the shield 150, its guideway 154 and the adjacent recess 156 in the housing 12 wider than in the form of the apparatus shown in Fig. 1.

While the apparatus shown and described has only one developing device which may hold a solution that will develop and also fix an exposed film, a second developing device 52 may be provided on the other side of the dark chamber 14, in which case the device 52 shown may hold plain developer solution, while the other device 52 may hold plain fixing solution. The devices 52 would then be used alternately for the treatment of an exposed film. Also, while the apparatus shown and described has a removable roll film holder 24, the same may obviously be used with a removable holder for a single film or photographic plate. Further, if the apparatus is used with a roll film holder, the latter need neither be removable from the apparatus nor have a slide 36, but may be made an integral part of the apparatus.

While I have shown and described the preferred embodiment of my invention, it will be understood that various changes may be made in the present invention without departing from the underlying idea or principles of the invention within the scope of the appended claims.

Having thus described my invention, what I claim and desire to secure by Letters Patent is:

1. Photographic apparatus, comprising a camera having a first chamber with provisions at one end thereof for removably mounting a photographic film for its exposure, and a lens at the other end of said chamber, and development equipment comprising a second chamber integral and in communication with said first chamber and having an internal surface, a carriage, a track in said chambers on which to move said carriage into positions adjacent said surface and a mounted film, respectively, an open-top tray for holding a liquid, said tray being mounted on said carriage for unitary movement with the latter into said positions and being depressible on said carriage for retraction of the open tray top from liquid-sealing engagement with said surface and with a mounted film respectively, operating means for moving said carriage and tray into either of said positions and for depressing said tray, including a manually operable device on the outside of said chambers, and a light-sealed operating connection between said device and tray, and means for forcing said tray with its open top into liquid-sealing engagement with said surface and with a mounted film respectively.

2. Photographic apparatus as set forth in claim 1, in which said tray-forcing means are springs interposed between said carriage and tray.

3. Photographic apparatus as set forth in claim 1, in which said surface is substantially co-planar with a mounted film, and said track extends substantially parallel to said surface.

4. Photographic apparatus as set forth in claim 1, in which said track is formed by opposite rails which at least within the confines of said first chamber are on opposite sides, respectively, of the path of light from the lens to a mounted film.

5. Photographic apparatus as set forth in claim 1, in which said carriage is provided with wheels with which to ride on said track, said surface is substantially co-planar with a mounted film, and said track extends substantially parallel to said surface and is formed by parallel rails on opposite sides, respectively, of the path of light from the lens to a mounted film.

6. Photographic apparatus as set forth in claim 1, in which said surface is the inner face of a wall of said second chamber, and said wall is provided with a filler opening, and a removable plug in said filler opening.

7. Photographic apparatus, comprising a camera having walls defining a first chamber, two of said walls being side walls arranged opposite and substantially parallel to each other, a lens at one end of said chamber, and provisions on the other end of said chamber for removably mounting a photographic film for its exposure, and development equipment comprising walls defining a second chamber of which two side walls are continuous with said side walls of said first chamber, said second chamber having an internal wall surface between said side walls thereof and being integral with said first chamber and in communication therewith between said side walls, a carriage, a track in said chambers on which to move said carriage into positions adjacent said wall surface and a mounted film, respectively, an open-tray for holding a liquid, said tray being mounted on said carriage for unitary movement with the latter into said positions and being depressible on said carriage for retraction of the open tray top from liquid-sealing engagement with said wall surface and with a mounted film, respectively, studs projecting from the opposite sides, respectively, of said tray, aligned U-shaped slots in said opposite side walls, respectively, of said chambers, each of said slots having substantially parallel branches and a connecting branch, said studs projecting with their ends through said slots, respectively, to the outside of said chambers, handles on the outer ends of said studs, respectively, for moving said carriage and tray into either of said positions and for depressing said tray, said studs travelling in said parallel slot branches on depression of said tray from engagement with said wall surface and a mounted film, respectively, and travelling in said connecting slot branches on movement of said carriage and tray in depressed condition of the later into either of said carriage positions, means for forcing said tray with its open top into liquid-sealing engagement with said wall surface and with a mounted film, respectively, and means for sealing said slots light-tight.

8. Photographic apparatus as set forth in claim 7, in which said light sealing means comprise shields drivingly connected with said studs, respectively, and movable on said opposite side walls, respectively, in covering relation with the respective slots therein.

9. Photoraphic apparatus as set forth in claim 7, in which said light sealing means comprise first shields having transverse slots, respectively, through which extend said studs, respectively, guideways on said opposite side walls, respectively, for said shields, respectively, for their longitudinal movement parallel to said connecting slot branches, and auxiliary shields connected with said studs, respectively, and being in covering relation with said transverse slots in said first shields in any position of said studs.

10. Photographic apparatus as set forth in claim 7, in which said light sealing means comprise first shields having transverse slots, respectively, through which extend said studs, respectively, guideways on said opposite side walls, respectively, for said shields, respectively, for their longitudinal movement parallel to said connecting slot branches, gibs on each of said first shields extending on opposite sides, respectively, and parallel to the transverse slot therein, and auxiliary shields through which extend said studs, respectively, said auxiliary shields being guided between the gibs on the adjacent first shields, respectively, in covering relation with the transverse slots in the latter.

11. Photographic apparatus as set forth in claim 7, in which the opposite side walls of said chambers are joined at their adjacent ends by transverse end walls, respectively, and said light sealing means comprise first flexible band-type shields having transverse slots, respectively, through which extend said studs, respectively, guideways extending along said opposite side walls, respectively, and continuing on said end walls, for guiding said shields, respectively, for movement in a plane parallel to the plane in which said connecting slot branches lie and in light-sealing relation with said U-shaped slots, and auxiliary shields connected with said studs, respectively, and being in light-sealing relation with said transverse slots in said first shields, respectively, in any position of said studs.

12. Photographic apparatus as set forth in claim 7, in which the opposite side walls of said chambers are joined at their adjacent ends by transverse end walls, respectively, and said light sealing means comprise first flexible steel tapes having transverse slots, respectively, through which extend said studs, respectively, guideways extending along said opposite side walls, respectively, and continuing on said end walls, for guiding said tapes, respectively, for movement in a plane parallel to the plane in which said connecting slot branches lie and in light-sealing relation with said U-shaped slots, and auxiliary shields connected with said studs, respectively, and being in light-sealing relation with said transverse slots in said tapes, respectively, in any position of said studs.

13. Photographic apparatus as set forth in claim 7, in which said light sealing means comprise said first shields having transverse slots, respectively, through which extend said studs, respectively, guideways on said opposite side walls, respectively, in which longitudinally to move said shields, respectively, parallel to said connecting slot branches in covering relation with said U-shaped slots, respectively, and in light-sealed relation with said guideways, respectively, and auxiliary shields connected with said studs, respectively, and being in covering relation with said transverse slots in said first shield in any position of said studs.

14. Photographic apparatus as set forth in claim 7, in which said light sealing means comprise first shields having transverse slots, respectively, through which extend said studs, respectively, guideways on said opposite side walls, respectively, in which longitudinally to move said shields, respectively, parallel to said connecting slot branches in covering relation with said U-shaped slots, respectively, and in light-sealed relation with said guideways, respectively, auxiliary shields through which extend said studs, respectively, and other guideways on said first shields, respectively, in which to move said auxiliary shields, respectively, in covering relation with said transverse slots in the latter and in light-sealed relation with said other guideways, respectively, in any position of said studs.

15. Photographic apparatus, comprising a camera having a first chamber with provisions at one end thereof for removably mounting a photographic film for its exposure, and a lens at the other end of said chamber, and development equipment comprising a second chamber integral and in communication with said first chamber and having an internal surface, a carriage, a track in said chambers on which to move said carriage into positions adjacent said surface and a mounted film, respectively, an open-top tray for holding a liquid, said tray being mounted on said carriage for unitary movement with the latter into said positions and being depressible on said carriage for retraction of the open tray top from liquid-sealing engagement with said surface and with a mounted film, respectively, operating means for moving said carriage and tray into either of said positions and for depressing said tray, and means for forcing said tray with its open top into liquid-sealing engagement with said surface and with a mounted film, respectively.

16. In a photographic camera comprising an enclosure having a chamber in which a photographic film is mountable for exposure through the camera lens, an open-top liquid container mounted in said enclosure for movement from a retracted position laterally of said chamber and of the optical axis of the lens to an operative position in said chamber between said lens and the mounted film with the open top of said container confronting the film for subjecting the exposed film to the action of the liquid in said container, said enclosure and said container having cooperating parts which provide a liquid-tight seal for said open top of the container, when the latter is in said retracted position, and means accessible externally of the enclosure for moving said container from said retracted position to said operative position, said enclosure having an opening in communication with said open top of the container in the retracted position thereof for supplying the liquid to said container without removing the latter from said enclosure, and a releasable cover normally closing said opening in the enclosure.

JOHN BASS.

REFERENCES CITED

The following references are of record in the file of this patent:

UNITED STATES PATENTS

| Number | Name | Date |
|---|---|---|
| 728,743 | Meek | May 19, 1903 |
| 1,424,816 | Grillone | Aug. 8, 1922 |

FOREIGN PATENTS

| Number | Country | Date |
|---|---|---|
| 127,743 | Germany | Feb. 4, 1902 |